United States Patent [19]
Rypinski et al.

[11] Patent Number: 5,388,126
[45] Date of Patent: Feb. 7, 1995

[54] BASEBAND SIGNAL PROCESSOR FOR A MICROWAVE RADIO RECEIVER

[76] Inventors: Chandos A. Rypinski, 655 Redwood Hwy. #340, Mill Valley, Calif. 94941; Gerald L. Somer, 921 Transport Way., Petaluma, Calif. 94954

[21] Appl. No.: 994,538

[22] Filed: Dec. 21, 1992

[51] Int. Cl.$^6$ .............................................. H04L 7/06
[52] U.S. Cl. ...................................... 375/113; 375/114; 375/58; 375/96; 364/728.06; 371/47.1
[58] Field of Search .................. 375/96, 115, 116, 113, 375/114, 58; 364/728.03, 728.06; 371/37.1, 42, 46, 47.1

[56] References Cited

U.S. PATENT DOCUMENTS

| | | | |
|---|---|---|---|
| 4,007,330 | 2/1977 | Winters | 375/96 |
| 4,104,629 | 8/1978 | Isbister et al. | 343/6 R |
| 4,312,074 | 1/1982 | Pautler et al. | 375/96 |
| 4,419,699 | 12/1983 | Christopher et al. | 375/114 |
| 5,012,491 | 4/1991 | Iwasaki | 375/96 |
| 5,051,991 | 9/1991 | Szczutkowski | 375/122 |
| 5,084,891 | 1/1992 | Ariyavisitakul et al. | 371/42 |
| 5,132,985 | 7/1992 | Hashimato et al. | 375/96 |

Primary Examiner—Stephen Chin
Assistant Examiner—Amanda T. Le
Attorney, Agent, or Firm—Larry D. Johnson

[57] ABSTRACT

A baseband signal processor within a radio receiver provides a design which does not materially increase the size and weight or decrease the battery life of the host equipment. A passive analog delay line is used for correlation by analog summing. The time discrimination function of spread spectrum is retained, and is used for one dimension of the diversity operation. A further analog integration technique is used to sum the data symbol energy received over a time interval corresponding to the delay differences of multiple radio paths. The input signal for the signal processor is an NRZ binary analog baseband waveform that is shaped for a minimal bandwidth transmission medium, but modified by the distortions which result from radio propagation. The output of the signal processor is the data content presented as clean logic-level states with lines for data and bit clock.

13 Claims, 6 Drawing Sheets

BIT PATTERNS 1111111, 0001111 AND 0101010

BIT PATTERNS 1111111, 0001111 AND 0101010

BASEBAND SIGNAL PROCESSOR FOR A MICROWAVE RADIO RECEIVER

BACKGROUND OF THE INVENTION

1. Field of the Invention

This invention relates generally to radio signal processing, and more specifically to a multi-megabit-data-rate baseband signal processor within a microwave radio receiver adapted to the size and power drain requirements for use with battery-powered portable computers. The processor's capabilities include those necessary for dealing with adverse distortion from radio propagation.

2. Description of the Prior Art

There is considerable prior art on the technologies of the invention, but not within the difficult constraints defined. Relevant prior art for portions of the invention are found in the following fields:

1) In a spread spectrum radio system, receiving correlator and data processing circuit design for implementation at multimegabit data rates based on the use of analog delay lines working at baseband.
2) diversity combining for primary and delayed propagation paths and including "RAKE" receivers for spread spectrum.
3) differential amplitude detection to decrease sensitivity to signal amplitude uncertainty.
4) matched filter demodulation with RC integrator.
5) direct sequence spread spectrum signal design with imperfect or semi-optimum spreading codes for high ratios of transferred information relative to occupied radio bandwidth.
6) selection of code patterns for minimum cross correlation while providing auto-correlation, e.g. "Barker" and "Gold" used in direct sequence spread spectrum.

Many prior art implementations have not considered the following simultaneous requirements:

a) very small size and low battery drain circuits including passive components, and
b) use of data rates sufficiently high to stress the speed limits of monolithic analog and digital integrated circuits, and
c) application to time dispersive multipath distortion in the transmission medium (radio propagation in this case), and
d) providing enhanced resistance to such time dispersion obtained from the combination of time and multiple antenna diversity, and
e) staying within constraints requiring the highest workable ratio of data rate to bandwidth occupied.

Taken one-at-a-time, the below listed points are known prior art. The qualifiers given cannot be altered to either diminish or expand the scope without reconsidering whether or not they remain within prior art.

1) Filter-based delay line correlation with the analog sum of the taps to detect the correlation peak for a single combining pattern.
2) Use of Barker pattern for spectrum spreading sequence, and use of the opposite polarity to obtain binary coding.
3) Use of Barker pattern for spectrum spreading sequence and pulse compression in radar where the propagation path is free space and very long.
4) Use of a diminished cross-correlation orthogonality for a set of symbols to increase the number of available auto-correlation patterns available for a given symbol length.
5) Use of the average value of a correlator output as a reference for differential detection of the correlation peak for completely orthogonal (Barker) symbol formats.
6) Design methods for flat delay lowpass filters using discrete components.
7) Use of more than one binary patterned symbol commonly based on "Gold" codes to create multiple simultaneously usable symbol values for channelization with symbols of 31 chips or more.
8) Use of more than one binary patterned symbol to create multiple one-at-a-time usable symbol values for increased information per symbol with symbols of 31 chips or more, and where orthogonality between symbols exists at only one time position of the symbol; and where the symbols become simultaneously usable only when the multiple signals have synchronized timing and equalized amplitude at the receiving point.
9) Power conservation by selectively powering circuit functions only when signal is present based on carrier detection.
10) Power conservation by selectively powering a digital circuit only when its function is needed.

In direct sequence spread spectrum modulation, the processing gain at best reverses the loss from spreading. If the given bandwidth is fixed, so is the maximum chipping rate holding modulation method constant. There is then a choice on the use of code space.

Most prior art references are for a multi-channel telephone service with many channels operated simultaneously at a low fixed rate. The described signal processor is for a single channel operated at the highest feasible rate sequentially allotted to users for a much shorter time.

Parallel and Simultaneous Low Rate Channels

For some prior art pocket telephones, a 512 chip symbol has been selected with the possibility of using 128 different codes at the same time, each providing a 32 Kbits/sec telephone channel at one bit per symbol. The ratio of chips-to-bits for the composite signal is in the range from 4:1 to 10:1 depending on system details. This process requires that all of the channel signals be adjusted to be received with common timing and amplitude at a common receiver.

Each code represents one voice channel in which the signal-to-noise ratio of a particular bit stream gets the benefit of the 512:1 processing gain if it is done before there is a nonlinearity in the signal path. This simultaneous use produces a higher composite noise level than for one signal alone. The increased noise of simultaneous use balances off the advantage of the large processing gain when the number of simultaneous channels is maximized.

One Sequentially Used High Rate Channel

Suppose now a LAN data system occupies exactly the same frequency space, but chooses a symbol length of 7 chips from which 4 codes are used to get 2 bits of information. The chip-to-bit ratio is 3.5, slightly better than the parallel system above. In addition, the noise of 127 other simultaneous users is not a consideration because the channel is used sequentially.

The aggregate throughput of the parallel mode is 128 bits per 512 chips while the sequential mode is about 146 bits per 512 chips. For the second system to carry the same traffic, each user would use the channel 1/146th of the time at 128 times the rate of the 512 chip symbol with time left over.

The air interface of this invention uses a short, simple symbol and intensely uses the code space to maximize the information per symbol. This optimization results in equal or higher spectrum utilization, and avoids serious and difficult technical problems in discrimination between large numbers of transmitters operating at the same time in the same frequency space and to a common destination.

The negative aspects are that the peak power required is in the same ratio as the reciprocal of the duty cycle. Though the average power is constant for a given speed of information transfer whether the transmission is continuous or burst. While the burst can require circuits which are less efficient because of peak power limitations, this point is much less important for milliwatt power levels.

There is a question of whether the range is greater for the more highly coded case. This point is not yet settled, but it is the opinion of this inventor that the advantage of great coding gain is undone by the liability of noise from simultaneous users.

If the plan must produce high communication capacity, the range will be shortened for this reason before the effects of time dispersion limit range.

The spending of code space for any combination of channelization and data transfer rate is a tradeoff. This invention maximizes data rate for a single channel, and accepts the burdens of fast transition between on and off. It avoids the need for channelization and an assignment protocol to negotiate the channel to be used for each data transfer.

SUMMARY OF THE INVENTION

The invention provides the design and principles of design of a baseband signal processor within a radio receiver design. When the complete radio function is added to a portable computer, it must not materially increase the size and weight or decrease the battery life of the host equipment. The invention is suitable for multi-megabit/sec data rates within these constraints.

A passive analog delay line is used for correlation by analog summing. Since each contribution to the sum is weighted rather than binary, this method is an analog form of a forward error correction code. The time discrimination function of spread spectrum is retained, and is used for one dimension of the diversity operation.

A further analog integration technique is used to sum the data symbol energy received over a time interval corresponding to the delay differences of multiple radio paths.

The input signal for the signal processor is an analog baseband waveform that is binary NRZ shaped for a minimal bandwidth transmission medium, but modified by the distortions which result from radio propagation.

The output of the signal processor is the data content presented as clean logic-level states with lines for data and bit clock.

The shaping of the NRZ signal and the radio up-down conversions are additional art outside of the scope of this invention. References to these areas are only for the purpose of better understanding the function of the present invention.

EXAMPLE SYSTEM PARAMETERS

Example numerical parameters for the signal as used within radio local area networks is shown in Table I.

TABLE I—EXAMPLE SYSTEM PARAMETERS

Transported data rate: 10 Mbits/sec
Period of one transmission: 20–2000 $\mu$sec
Symbol rate: 5 Msymbols/sec
Symbol length: 7 chips/symbol
Chipping rate: 35 Mchips/sec
Period of one chip: 28.6 nanosec
Propagation distance during one chip: 8.58 meters
Symbol definitions—
Data and delimiters: 1-of-6 chip patterns
Synchronization: normal "Barker" pattern
PHY level and fall-back signaling: normal/invert "Barker"
Pattern squareness: 3/7 or 4/7 1's
Cross-correlation of patterns: 7:1 in 3 chip window
Ratio of chipping/data rates: 3.5:1
Clock acquisition time—maximum: 4 symbols

SIGNAL DESCRIPTION

The operation of the signal processor is better understood, if the air signal and basic radio function are defined.

Radio Conversion to Baseband (for reference only)

The air signal transmits data in the form of well-known double-sideband suppressed carrier with linear use of amplitude information. The phase of the suppressed (on the average) carrier represents the polarity of the amplitude. With a limited-bandwidth baseband shape corresponding to NRZ data, the binary value is carried in the phase of the radio signal within the envelope rather than amplitude.

The suppressed carrier is transmitted and detected separately so that the envelope waveform can be recovered with a signal that has traversed the same radio path as the sidebands that it is used to demodulate.

The result is that the recovered amplitude envelope is a polar reproduction of the signal used to create the transmitter signal except for the distortions introduced by propagation over the radio path. This baseband signal is the input to the signal processor of this invention.

Symbol Coding

The baseband binary NRZ signal is coded in seven-chip (chip=sub-bit) blocks called symbols. The symbol chip patterns are used for data, management and synchronization functions where four symbol patterns represent 2 bits of data for each symbol and the normal polarity of the Barker pattern is used for synchronization in the message preamble and both polarities are use for a management or fall-back data channel.

The method of selecting the particular data chip patterns used is described below.

SIGNAL PROCESSOR

The signal processor is built up from the following sub-functions.

Correlation Method

An analog tapped delay line is used with tap spacing equal to the period of one chip. The length is one tap more than the symbol length in chips. Correlation for each possible pattern is performed by summing the signals simultaneously present at seven contiguous taps. The expected binary value of the pattern is selected by strapping each input of the summing network to either the normal or the reverse polarity of the tap.

At an instant, the composite value may reach the sum of the absolute values when the transmitted and expected pattern match. The correlation window property of the data symbols keeps the off-peak value minimal for patterns arriving one chip before or after the expected pattern peak.

This process is linear. The noise bandwidth is that of the NRZ information rather than that required to pass the baseband signal at the chipping rate.

If the same functions were performed, as in much prior art entirely in logic, the noise bandwidth would be that of the chipping rate and resistance to interference and multipath fading would be diminished.

Gain and Level Accommodation

For a linear radio system, it is necessary that gain adapt to signal level as measured after correlation to normalize the levels at the point of analog-to-digital conversion and to minimize exposure to overload from other interfering radio signals. Gain adjustment must be very fast which makes it impossible to hold levels within tight limits.

Moderate uncertainty of signal level at the differential amplifiers and quantizer level sensing points is accommodated by making all decisions differentially. The level of the expected patterns is compared with the aggregate level of the alternative patterns that might be present.

In addition, a variable gain baseband amplifier is controlled by feeding back the level of the received signal after correlation. Instead of providing a threshold type of amplitude detector, a compressor mode is used where the range of the output is a fraction of the dynamic range of the input. This circuit contains lower (than threshold reference types) loop gain; and therefore it can be faster while maintaining stability.

These measures together with like type circuits in the radio up-down converter, allows the radio receiver to quickly adapt to a wide range of signal levels.

Symbol and Chip Clock Acquisition

At the beginning of a burst transmission, the synch symbol is recognized in the correlator to form a pulse output to synchronize symbol and chip clocking. Sufficient information is present for acquisition after one symbol has been received, but a more accurate result is obtained by refining the timing by averaging of up to four symbol intervals.

This averaging function is called a "flywheel" function that is provided in the clock processor. A loss of signal for one or two symbols would be bridged without requiring reacquisition. Also, time distortion of the output synch pulse is diluted in its effect if it is temporary. Also, the noise bandwidth of this function is reduced and is much less than that of the data detection process.

If the synch pulse output is stretched in time, the circuits used favor the first signal to arrive unless a later signal is considerably stronger.

Management and Physical Medium Test Signaling

Logic is provided within the signal processor to receive elemental binary messages using only the normal and inverted synch character. When such a message is received, the radio and signal processor can supply management communication independently of, but not simultaneously with, the normal data stream communication with higher layer functions. This capability is taken up in further detail later below.

TIME AND SPACE DIVERSITY PROVISION

Use is made of concurrent copies of the same signal delayed in time one chip interval after the first to arrive. Linear summing at baseband and other provisions enable use of more than one receiving antenna as may be useful. Two space paths each providing two time paths is the level of diversity used in this description.

Path Diversity

The output of the correlator synch channel, when the synch character is transmitted, is the impulse response of the radio channel with the resolution provided by the chipping rate. For a single optical path, this is a single pulse with the width of one chip. Each additional path overlays a new copy of that same pulse but delayed in time and probably (but not certainly) reduced in amplitude relative to the unobstructed path. Path diversity depends on the difference in transit time for secondary paths.

For example, if a station antenna were 4 meters in front of a wall receiving in a direction perpendicular to the wall and away from it, the direct signal and the signal reflected off the wall would be separately detected and added (using the Table I Example System Parameters shown above).

A first signal might be detected, and then a second corresponding to an interval one chip later. Despite the time difference, the method of this invention adds the two signals by accumulating their amplitude-time product in a capacitor (area integration), and evaluating the result after an interval of one, two or three chip intervals.

If there are two signal paths with much less than one chip time separation, as might be the case for direct and floor bounce, then there is fading (Rayleigh distribution) from the vector addition of the two or more signals.

Space Diversity

The main mitigation for Rayleigh fading signals is use of more than one antenna where adverse addition of signal paths on one antenna does not usually occur at the same time on a second antenna with a different location or polarization.

For multiple antenna diversity, combining at the baseband level is employed where the sum is independent RF phase and when the differences in arrival time are a fraction of a chip interval. A separate signal processor is required for each antenna.

The combining method used requires a form of radio and demodulation that provides a baseband representation of the received digital information.

The cross-tied automatic gain control is important because it reduces the gain of all channels to that of the channel with the strongest signal. Degradation of the resultant data output from the antenna with poor signal level is reduced thereby.

DETAILED DESCRIPTION OF A PREFERRED EMBODIMENT

The signal processor implementation may be better understood after a more detailed description of the signal it processes. Following, the signal processor and its functions are described.

SELECTION OF SYMBOL CODES

Known art uses a simple spreading code that is a "Barker" character commonly of 11 or 13 bits and possibly of 7 bits. Longer symbols use "Gold" codes which are a practical approximation of orthogonality or "Walsh" codes which are orthogonal only at one point in time. Each of the Barker patterns has the special property that when multiplied by itself, the resulting cross-correlation value is limited to $\pm 1$ except for the position of the correlation peak. When the one pattern equal to the Barker is used and when it is aligned with the same pattern in the filter, a peak of 7, 11 or 13 is obtained.

The Barker character is used during the preamble of the burst message to acquire chip, symbol and bit clock. The multi-valued symbol used for data is only possible because of advance knowledge of the position of the time window in which the correlation peak will occur after symbol and chip clock have been acquired.

The ratio of the peak value to maximum off-peak is termed the "sidelobe" level.

The power level of the correlation peak relative to the sidelobe level is given below:

TABLE II

| PEAK-TO-SIDELOBE LEVELS VS. SYMBOL LENGTH | | | |
|---|---|---|---|
| Code length: | 7 | 11 | 13 |
| Relative power level: | 16.9 | 20.8 | 22.3 dB |

The symbol chip patterns used for data representation are selected using the following criteria:

1) limiting cross-correlation with all other bit patterns to a value of $\pm 1$ relative to a peak of equal to the number of chips in the pattern (e.g., $+7$) and within a timing window that includes at least the previous and following chip. For a given chip length for the symbol, a list of candidates can be derived.

2) two codes from one pattern are allowed where the second code is a reversed polarity pattern of the first code.

3) only one code is allowed from a set of sequences in which the sole difference is the starting point for the sequence except that, if the rotation is greater than the window width, it is allowed.

4) from the candidate codes from the step above, the chosen codes have either 3-or-4-out-of-7 1's in every case, and near equal values on the average.

Candidate symbol lengths from 7 to 15 chips per symbol were studied. This invention is based on the conclusion that the lengths in which the Barker properties are available should be used. This enables acquisition of symbol framing used to position a detection time window that is a fraction of the symbol length.

The choice is biased in favor of 7-bits rather than 11 or 13 by spectral efficiency in which the ratio of bits per Hz of spectrum space is maximized. For the short-reach application, this is a stronger motivation than maximizing processing gain or resistance to narrow band interferers.

The further conclusion is reached that the added processing gain of 4 db in exchange for more than 50% increase in occupied bandwidth obtained with use of the 11-bit symbol is not favorable for short-reach radio with high-data-rate in which cost and battery-drain are dominant considerations. This added processing gain only reverses the loss in sensitivity from the added bandwidth. Its main advantage would be increased path length resolution at the expense of data rate.

It was found that symbol lengths with even numbers of chips, tended to have unavoidable multiple correlation peaks, and are therefore not usable.

A further consideration is the number of available codes meeting all of the necessary criteria. Two sets of one-out-of-six usable patterns usable for data, have been found for 7-bit symbols in which the cross-correlation is complete for three adjoining chip intervals. Each of these two sets is separately usable, but not both together. In one of these sets, the Barker character and its inverse are two of the patterns.

For 11 and 13 chip codes, an insufficient number of symbol definitions were found that would enable reaching the next step of usefulness where there would be 16 patterns providing 4-bits per symbol with an orthogonality window of at least 3 chips.

Symbol Codes Defined

The meaning assignments below are wholly arbitrary except for the synch. The synch must use the Barker character full width window. Use of the reverse polarity enables the synch character to transmit a binary value. This property is used for a half rate bit stream with greater resistance to time dispersion.

Pairs of symbols are obtained by reversing the polarity of the chosen symbols transposing 1's and 0's. This fact is later used to slightly reduce the complexity of implementation.

If channel coding is limited to sets of four symbols, there are four sets available which are not independent or simultaneously usable. One-of-four coding corresponds to two bits per symbol.

Table III below shows the chosen set with six possibilities not including the use of the Barker for data symbols, and it is the one chosen for the example implementation.

TABLE III

| SYMBOL CODE SETS | |
|---|---|
| Assignment | Symbol |
| 00 | 0100011 |
| 01 | 1011100 |
| 10 | 0010111 |
| 11 | 1101000 |
| Synch-normal | 0001101 |
| Synch-invert | 1110010 |

Anticipated Addition of a Double-rate Primary Communication Mode

The radio output might be two baseband channels, with the second channel transmitted simultaneously in the same frequency space but with a quadrature phased carrier. The original and the added channel can be independently demodulated using quadrature phased carriers according to known prior art. Two parallel signal processors would then be required with logic level outputs used alternately.

The disadvantage would be that the time dispersion in the propagation medium would degrade the phase relationships necessary for independence. There could be cross coupling ("crosstalk") between the two channels resulting in errors. Since it is a major advantage to double the data rate in the same bandwidth, the likelihood of a net gain is high.

Addition of a Fall-back Communication Mode

It is expected that some versions of this signal processor will provide a back-up lower rate communication mode for unusually adverse radio conditions.

Use of the Synch invert and normal codes only, which with a window of 7 chips, provides a half speed communication channel less susceptible to time dispersion in the medium.

Tradeoff of Rate and Reliability

Fully extended, this invention could provide three levels of rate vs. interference resistance tradeoff. The more intensively the channel is used, the lower the resistance to fading and time dispersion. The signal processing is adapted to selective use of data rates over a 4:1 range in which lower speeds are used for equipment simplification or greater transmission reliability. This relationship is qualitatively shown below:

TABLE IV

| RATE VS. RELIABILITY TRADEOFF | | |
|---|---|---|
| Resistance | Throughput/Hz | Format of Data Stream |
| A) Higher | 1 (reference) | Synch character only |
| B) Normal | 2 × A) | Synch, two data symbols |
| C) Alternate | 2 × A) | Synch character only using both normal and quadrature phase carriers |
| D) Lower | 4 × A) | Synch, two data symbols each on normal and quadrature phase carriers |

The use of these capabilities chosen as the best implementation for normal communication is B) above but also using A) for a management and fall-back communication mode. It is expected that C) and D) will come into use at a later stage after experience implementing the non-quadrature modes.

DESCRIPTION OF THE SIGNAL PROCESSOR

The signal processor is composed of the following functions:

1) baseband variable gain amplifier.
2) 8-tap, 7-section delay line with active isolation between lowpass filter sections.
3) linear analog correlation block with separate parallel summing circuits for each possible symbol value and with linear pulse outputs for each possible symbol.
4) diversity-input combiners to enable input to the quantizer from multiple correlators.
5) an integration function to sum data energy received in successive time intervals before quantization.
6) quantizer to convert analog outputs to logic level
7) symbol frame, bit and chip clock acquisition and "flywheel" circuit.
8) chip, bit and symbol clock pulse generation by processing of either initial synch or later data symbols.

Discrete Component Delay Line

Figure 1:
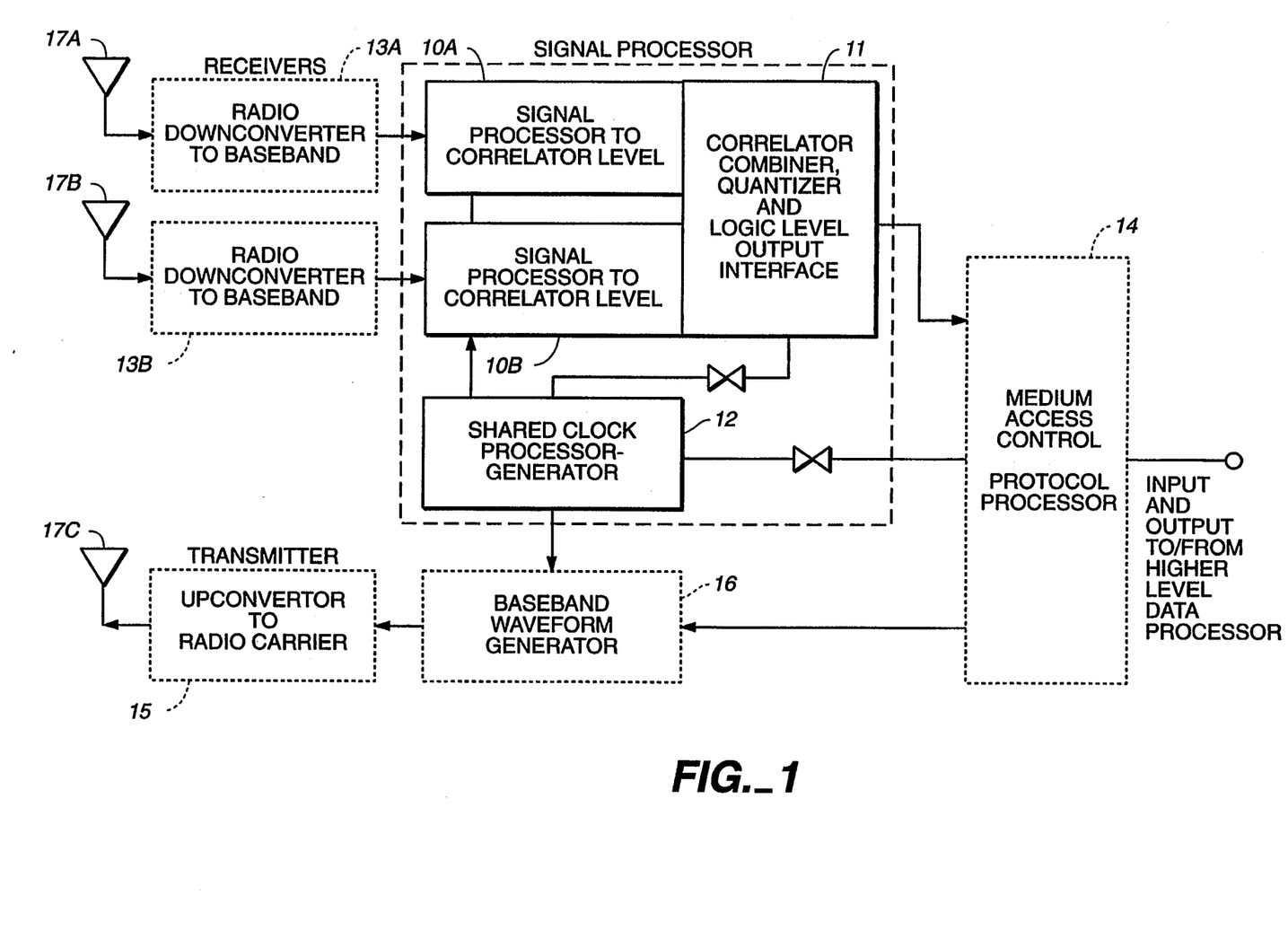
FIG. 1 is a top level block diagram of a complete user station including radio transmitter and receiver, the signal processor and the access protocol logic. The subject of this invention is the signal processor (10, 11) and the receiving part of the shared clock processor-generator (12) all shown in solid lines. Blocks for two antenna space diversity are shown, however the number of diversity antennas is not limited by the technology used for as many as eight antennas. The band-width limited baseband interface is the input to the signal processor shown between 13 and 10.
Figure 2:
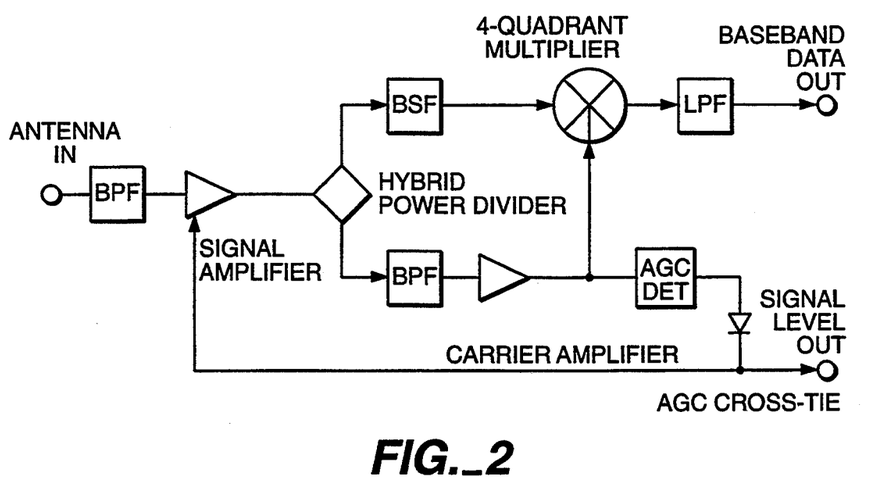
FIG. 2 is a block diagram of the radio receiver translator to baseband, and it is shown for reference only.
Figure 3:
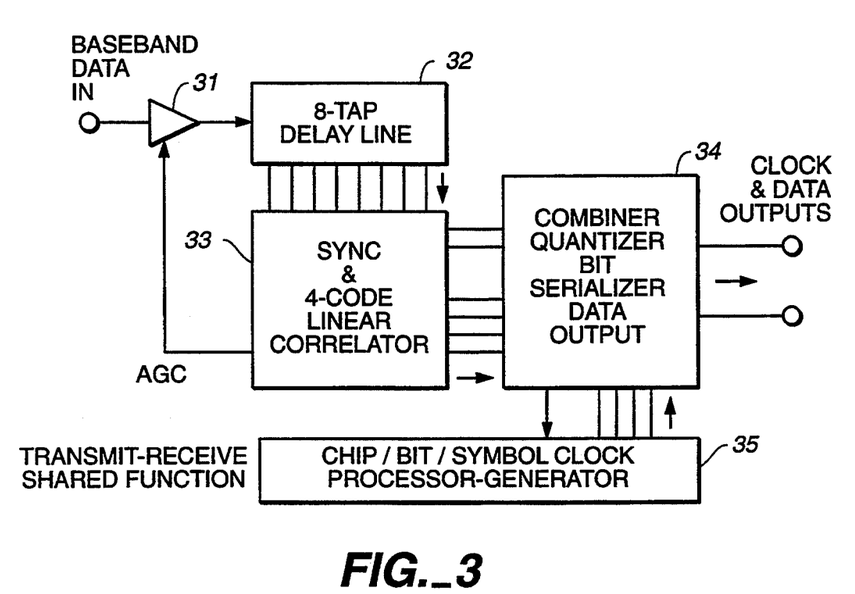
FIG. 3 is a block diagram of the signal processor and its circuit sub-blocks showing their arrangement for one antenna.
Figure 4:
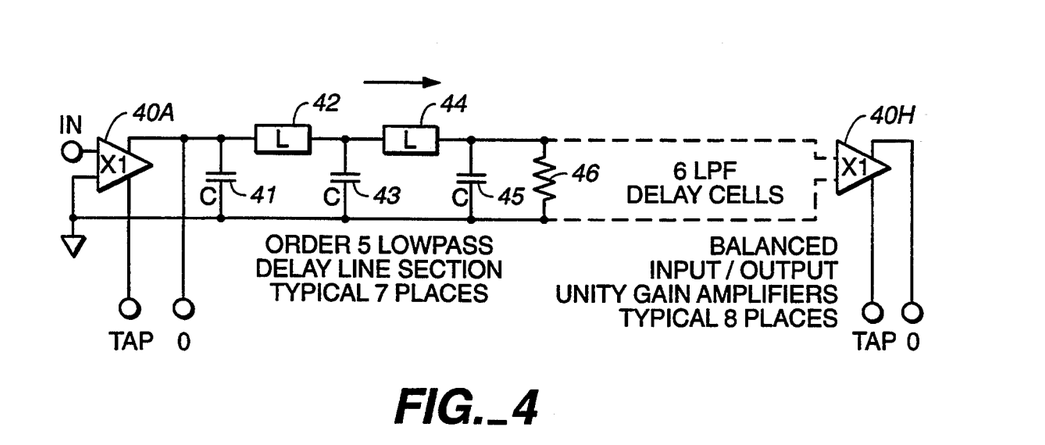
FIG. 4 is a schematic diagram of the 8-tap delay line with active isolation between sections shown as a single-ended implementation.

As shown in FIG. 4, the 7-section delay line 32 is obtained from a flat time delay Bessel response lowpass filter that may be implemented in several different ways depending on chipping rate or period. For moderate data rates, the initial preferred form uses discrete passive inductors and capacitors. Each tap is buffered into separate outputs for normal and inverted polarity.

While this delay line can be realized in more common single-ended form, the balanced form is preferred for several reasons: 1) ground currents are small or absent greatly reducing the possibility of interaction with higher or lower level circuits causing spurious feedback, 2) when implemented as copper patterns on a substrate then a) the radiation from the inductors may be reduced by opposite phasing, and b) the symmetry may be used to absorb lead length reactances into the components of the filter. Also, balanced output section isolation amplifiers will be needed for the simplest coding of the correlator function regardless of whether the filter is balanced. The main disadvantage is that the number of inductors is doubled, which could be costly for discrete component versions of the filter.

It is desirable for the signal spectrum to be contained in a band below 40% of the 3 dB down frequency of the lowpass filter. For a 35 Mchip/sec rate, this implies a 3 dB cutoff frequency near 80 MHz. Realization at this frequency is easier with smaller inductor and larger capacity values.

This is done by operating the filter at lower impedance levels. Since the symbol coding eliminates the dc component in the baseband waveform, it is possible to use transformers for impedance changing.

Preferred Implementation for High Data Rates

The same function can be accomplished with transmission lines with a propagation delay length equal to one chip. For the example parameters given, this dimension would be about 5 meters for teflon insulated coaxial cable.

It is now forseeable that film bulk acoustic wave technology could be used to reduce the transmission line length to a few tenths of a millimeter. It follows that it will be possible to incorporate this function within a mololithic integrated circuit so that most of the signal processor funtion could be implemented as one monolithic integrated circuit.

The detail design of this comoponent is outside of the scope of this invention, but the use of this type of component would be an application and improved form of implementation of the invention.

This form would be far smaller and lower power drain than known alternatives.

Baseband Frequency Amplifier and Automatic Gain Control

Figure 5:
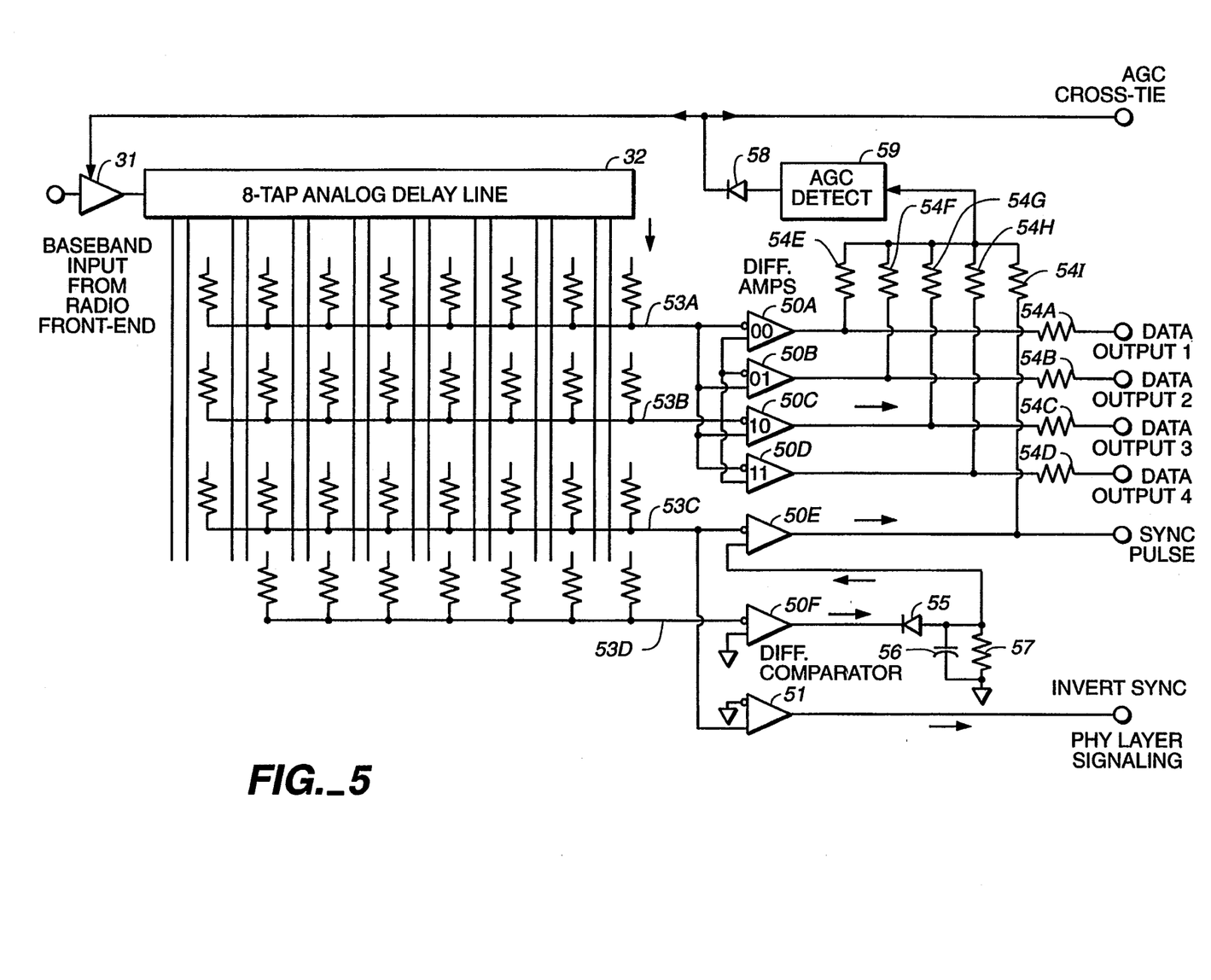
FIG. 5 is a schematic diagram of the correlator portion of the signal processor. One is required for each diversity antenna used.

As shown in FIG. 5, a large part of the radio gain is at baseband before correlation where a medium gain (26 dB approx.) video type amplifier 31 is effective and simple. Balanced (pushpull) configuration is preferred though not required or shown. The use of a balanced structure minimizes the possibility of coupling through the power supply or circuit board to later analog or logic level functions following correlation.

The gain control means is a further detail not shown. It is better provided by a balanced voltage-controlled attenuator with up to 40 dB attenuation rather than varying amplifier gain with bias. This function can be provided by MOSFET transistors in resistance mode. The control voltage is derived after correlation.

The sensor of signal level is a peak reading voltmeter function in 59, and it operates on whichever of five possible sources is highest in level as assembled by summing resistors 54E to 54I.

Diode 58, when multiple correlators are tied together on a common AGC line, causes the gain to be determined by the correlator receiving the highest signal level.

This function assumes compression of the dynamic range in the preceding radio transducer to baseband 13.

Correlation, Differential Summing and Reference Comparison

Different references are used for 4-symbol data, synch and fallback signaling. The preferred methods are described, but in some cases there are other workable alternatives.

Reference for Synch Pulse Detection

The value at the input of differential amplifier 51, the summing junction of the Barker pattern filter, is either +1 or −1 for a continuous random binary pattern stream except when the Barker pattern or its inverse polarity occurs.

This observation is modified when there is multipath time dispersion. There will then be a correlation peak for each distinguishable time delay, and a shape modification of those that overlap the chip interval. Of these one or two will be highest amplitude though not necessarily the first to arrive.

The present circuit bases timing on the first-to-arrive correlation peak provided that a later peak is not greatly above that level.

The same Barker pattern filter used for detection of the synch symbol can be used for the source of the peak value that is selected from all of the correlation peaks that may be present within one symbol interval. However a separate but identical filter is used that is shifted one chip later, so that the refreshing of the reference level occurs after it has been used instead of concurrently.

Circuit Description for Synch Pulse Detection

As further shown in FIG. 5, the synch pulse is generated by the correlated input to amplifier 50E. The differential reference for that is generated by a correlation from resistors 53D that occurs one chip later than for resistors 53C. The sequence of events starts with a correlation peak at the input of amplifier 50F.

The output of amplifier 50F charges capacitor 56 to the peak received value through diode 55 which also isolates the amplifier from the capacitor when the peak has passed. Capacitor 56 discharges slowly through resistor 57 so that its value may have decayed to a fraction of its initial amplitude when the next correlation peak for the synch pulse at the input of 50E occurs 6 chips later. The voltage across capacitor 56 is stable during the time of the synch pulse, and it is re-established one chip later when the synch function is quiescent.

When there are two or more radio paths causing two or more correlation peaks, the operation of this circuit is defined. As described, the circuit will synch up on the first pulse to arrive unless the second is several dB higher in level. If the second pulse is about the same amplitude, the continued output from 50E will be greatly diminished or eliminated by the first pulse raising the reference voltage at the output of 50F to the full amplitude of the first pulse. If the second pulse is greatly higher in amplitude, the first can go undetected.

The prejudice in favor of the first pulse to arrive is not for circuit convenience. It is deliberate on the assumption that time dispersion will be the least degrading for radio paths that are the most direct.

The synch pulse so derived is passed to the circuit functions in the combiner, quantizer and clock processor from the output of amplifier 50E.

Because 53C and 53D are Barker patterns, there is no correlation peak at any time when the data symbols are being received.

Reference and Circuit Description for Data Symbol Patterns

As shown in FIG. 5 each of the data symbol patterns is assembled by summing resistors 53A and 53B connected to either the + or − output of each tap of the delay line 32. The summing junction for one symbol pattern is at the + and − inputs of fast differential amplifiers 50A and 50B. Similarly, the other symbol is connected to + and − inputs of 50C and 50D.

Each of the two correlation lines is capable of three values: +7, ±1, −7, but only one of them can have a high absolute value at any one time. When one line is either +7 or −7, the other correlation line will be ±1. The reference for either line is the other line.

Each correlation symbol represents one-of-four two-bit possibilities, The output of each of the differential amplifiers 50 are marked with the bit values each represents.

The signals leaving the correlator are analog, however the noise bandwidth has been reduced to that of the information at this point.

This method of detection enables restoration to narrow bandwidth to take place with a minimum of preceding amplification. This is most important to minimizing the possibility of overload from unrelated interfering signals.

Invert Barker and Fall-back or PHY Layer Signaling Circuit Description

The output of the Barker correlator is +7, ±1 or −7. Using a single differential amplifier 52 referenced to 0, the binary levels may be detected though the output is undefined for no signal. The circuit is polarized so that the normal synch is opposite in polarity to that which might be used as physical medium end delimiter.

The reference for this comparator can be further refined by using feedback to provide the reference. If there is bias offset within the comparator circuit, the symptom will be asymmetric lengths of 1 and 0 outputs. The average output should be zero but may contain a small error component which, when fed back to the negative input, will result in correction.

This arrangement is usable only because on the average the symbol code contains an equal number of 1's and 0's.

Noise Bandwidth

After correlation, the noise bandwidth is reduced from that of the chipping rate to that of the symbol rate. The noise bandwidth is reduced to that of the information at a low level rather than at logic level some 60 dB higher. This lowers power consumption and increases dynamic range.

Combining and Quantizing

Figure 6:
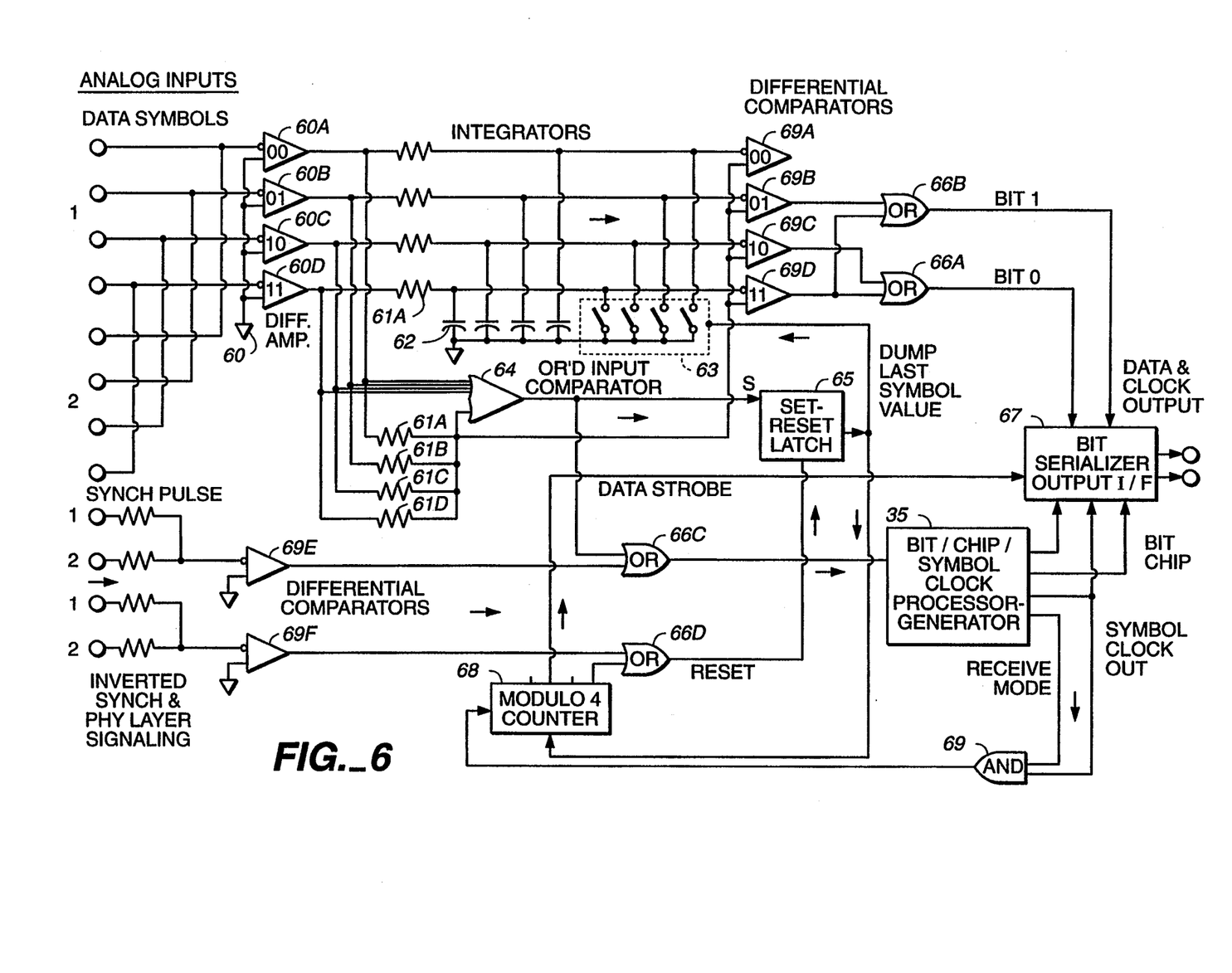
FIG. 6 is a schematic and block diagram for the combiner, quantizer and logic level interface portion of the signal processor with inputs shown for one or two correlators.

The combiner and quantizer circuits are shown in FIG. 6. For multiple-antenna diversity, this is the combiner that assembles the outputs of two or more correlators at analog level, and then converts the sum to logic levels.

As shown in FIG. 6, a comparator circuit follows each of the above correlator differential amplifier outputs. The comparator provides a logic level output depending on whether the active input is above or below a reference level.

Inherently, the comparators provide much of the radio gain. The range of output levels from the operational amplifiers may span as little as several millivolts between states, and the comparators must amplify this difference to a logic level of a few volts.

It is only necessary for the data comparators to be powered when the output is used. It may be possible to design these circuits so that they are powered by the read ("strobe") pulse.

The output clock pulses are generated in the clock processor-generator to be described below. The clock processor-generator gets its primary information from the synch and data clock passed from the correlator and through the quantizer via 60A-60D, 64 and 66C.

The Synch Function

The presence of a correlated synch pulse is the first evidence of signal present, and this state is the starting point for all further circuit function.

The analog synch pulse is summed for two diversity sources in resistors 61E and 61F and converted to logic level by the differential comparator 69E. Pulses obtained from the data lines and from 69E are alternative inputs to OR gate 66C.

Data appears as analog pulses at the output of one-of-four differential amplifiers 60A to 60D. The summing resistors 61A to 61D provide a reference. OR'd comparator 64 functions like four comparators with a logical OR of their outputs. The output of 64 is asserted when any of the four inputs go above reference level.

The decision that any one of the possible symbols is present is made on the observation that its value exceeds that of the average of all four outputs. During the correlation interval, one of the four summed levels is +7, one is −7 and the two others are +1 and −1.

This method of decision is independent of signal level provided that no preceding circuit function is operating at signal levels high enough to cause non-linearity (limiting, clipping).

Figure 7:
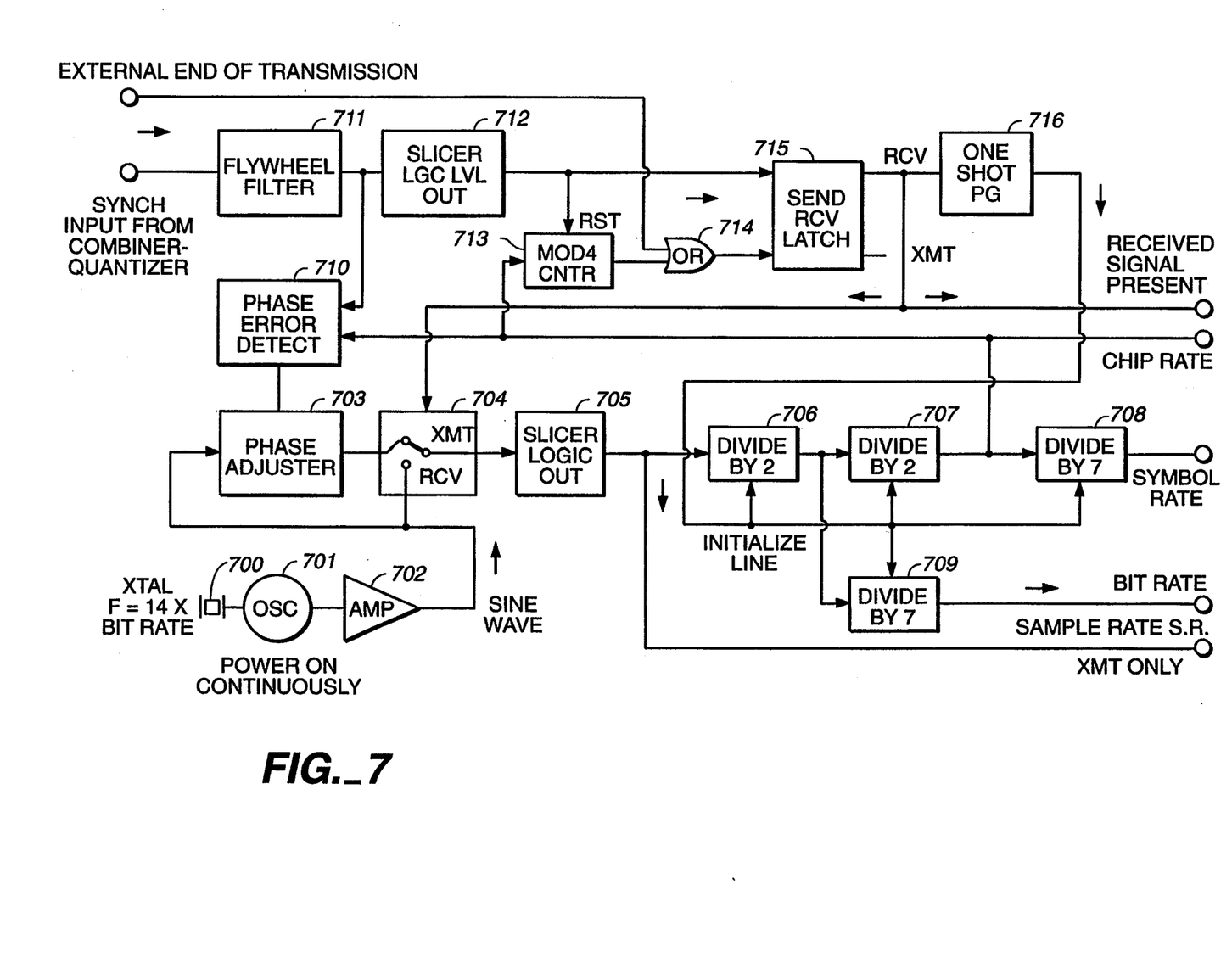
FIG. 7 is a block diagram of the transmit-receive clock processor generator. All of the functions shown are necessary for receiving but only a subset for transmitting.
Figure 8:
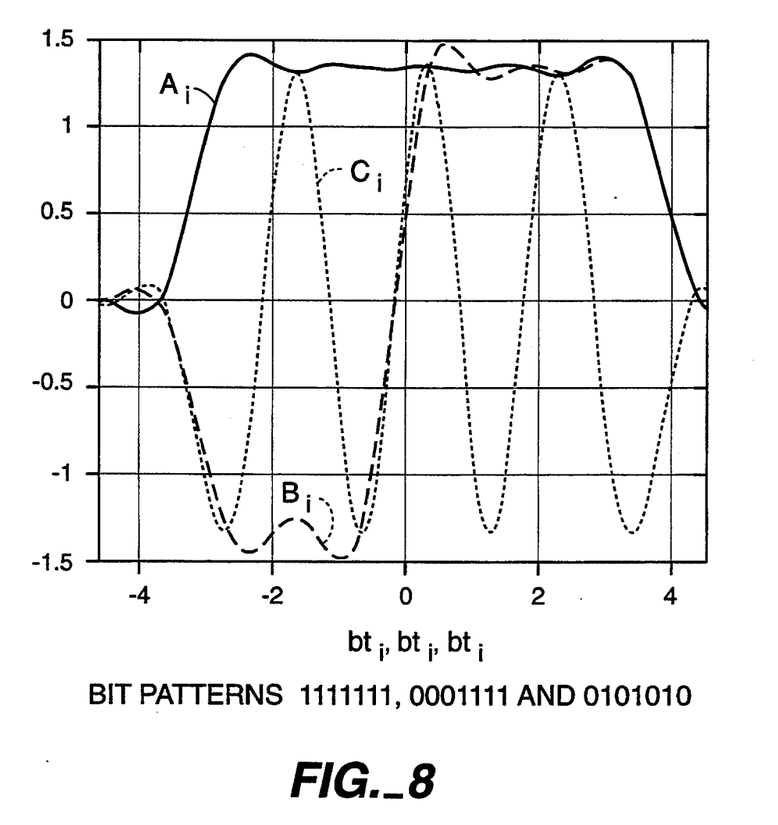
FIG. 8 is a tracing of the mathematically computed shape of one pulse of the baseband signal and for an interval of 7 bits for 3 different bit patterns.

The output of OR gate 66C provides a symbol rate strobe pulse from synch or data. These pulses are later used to energize a "flywheel" circuit in the clock processor 35.

Initially, the circuit will synchronize to the first adequate synch pulse to arrive. Later, accommodation may be made for higher energy levels in later arriving signals.

The data clock is at the symbol rate and occurs concurrently with data. When there are additional delayed data paths, the clock is normally concurrent with the first significant signal to arrive, but may alternatively coincide with the strongest signal to arrive.

The Data Integration and Quantization Function

The data output is formed in four comparators 69A to 69D and two OR gates 66A and 66B corresponding to bit 0 and bit 1. It is this part of the signal processor that provides the elasticity to deal with two or more correlators where the arrival time of the current signal is different for each of the correlators. This accommodation will usually synchronize on the first signal to arrive, but will use the energy in later delayed copies.

There is one resistor-capacitor integrator, 61 and 62, for each of the operational amplifiers 60A to 60D. The function of the integrator is to accumulate the energy received during a first and one or two following chip intervals. It is preferred that the data value decision be made based on the sum of the energy received in successive time intervals corresponding to different length radio propagation paths.

The capacitors 63 are initialized to a low value of charge by short-circuit from switches 63 in the quiescent condition. The state of the switches can be changed to open following the state of latch 65. The latch is moved to the active state by the leading edge of the first data pulse appearing at the output of comparator 64. The latch 65 is reset back to the quiescent state when modulo 4 counter 68 has counted three chip intervals following the beginning of the active state of latch 65.

The reading of the charge value on the capacitors 62 occurs at the chosen count value of counter 68 for the strobe pulse to be applied to the bit serializer 67. As shown, the strobe would read the value at the end of the second chip interval. Moving the connection from state 2 to state 3 on the counter 68 would have the affect of summing the received energy for three chip intervals (there are seven chip intervals per symbol, and orthogonality between symbols only exists for three intervals).

The counter is locked in initial state except when latch 65 is active. Chip clock is available for counting only when the clock processor is in receive mode through the action of AND gate 69.

For the bit 0 OR gate 66A, the two inputs are OR'd to the 10 and 11 comparator outputs. For the bit 1 OR gate 66B, the two inputs are OR'd to the symbols 01 and 11 comparator outputs. The output of the 00 comparator 69A is redundant and not used. This is so because the logic circuits default to 0, and only the value 1 needs to be asserted when present. All differential advantages were obtained at the analog levels.

A small amount of positive feedback across the comparators 69 will create some hysteresis preventing flutter of the output state when the input signal is just at the decision threshold.

Bit/Chip/Symbol Clock Processor-Generator Subfunction

The first few (eight typical) symbols of a transmission are synch characters. This preamble allows settling time for automatic gain control and it provides time for acquisition of symbol framing and bit/chip clock.

Use of the Barker character for synch is necessary because this symbol alone has a single correlation peak regardless within a symbol width window. The data characters used have responses outside of the three chip window that is defined.

When the signal first appears, there is immediately output of correlation peaks from the synch symbol detector in the correlator. The analog signal is then quantized into the logic level signal appearing at the output of OR gate 66C, and this is the primary input information for the Bit/Chip/Symbol Clock Processor-Generator Sub-function 35.

This module contains a crystal-controlled local clock reference oscillator and isolation amplifier, 700, 701 and 702, which operate at low level and are continuously powered. All other circuits may be selectively powered to function only when needed.

For transmitting, the local clock is selected directly by switch 704 to drive slicer 705 the output of which is a logic level signal. The dividers 706 to 709 synthesize the necessary clock signals for synthesis of the chip, bit and symbol rates. The symbol divider block uses assembled count for the output pulse making the width of the pulse that of the divider input. The divide-by-two block outputs are square waves.

The function described is necessary for transmit mode, and is a subfunction of the present invention. The same circuits and functions are required for receiving, except that the timing must be locked to that of the incoming signal.

Flywheel Filter and Processing

The synch input pulse during the first few symbols, and also probably thereafter, is about a half chip wide. This pulse is used to excite a parallel inductance-capacitor circuit 711 resonant at the chip rate. Successive pulses at the appropriate time are additive except that the amplitude buildup is limited. Parameters for source impedance of the driver are chosen so that several (4–8) pulses are required for the resonant circuit to reach its final amplitude. The Q is chosen so that it takes absence of several pulses for the level to decay to an unusable level. This is the "flywheel" property.

The result is similar to a narrow band filter insofar as the effect of singular changes in time or amplitude of the input. The voltage across the resonant circuit is at the symbol rate which is very close to the natural resonant frequency of the resonant circuit. The resonant frequency could also be an integer multiple of the resonant frequency.

The waveform across the resonant circuit 711 is a sine wave which is the input for slicer 712, a comparator with zero reference level. The output is a logic level square wave with transitions at the same time instant as the zero crossings in the input sine wave. One polarity of the logic level output is clamped near zero and the other is active high.

Fixed phase shift may be inserted between the filter and the slicer to compensate for systematic phase discrepancies in the processing.

Send-Receive Mode Control

Quiescently, the processor is in transmit mode inactive. An event is required to make it active in either transmit or receive mode.

The initiating event for receive mode is logic level output from slicer 712 which causes the set-reset latch 715 to toggle to the receive mode state. It remains in this state until either there has been absence of pulses for a few symbols as determined by the modulo 4 counter 713 or by end of message status originating outside of the present invention and applied to one input of the OR gate 714.

When the latch 715 starts receive mode, the output transition is sensed by a "one-shot" pulse generator 716 formed from the logical combination of the initiating state directly and a delayed copy of it.

The state of latch 715 is used externally as the logical indication that a valid signal is being received.

Initialization and Phase Adjustment of Output Clocks

The pulse from one-shot 715 initializes all counters and dividers connected to its output. The timing of all of the output timing pulses then have a fixed and defined relationship to the timing of the initiating pulse entering the flywheel filter.

This is an approximate relationship which is refined by first comparing the symbol clock obtained from the flywheel filter 711 and from the divider 707 in a phase error detector 710. The output of the error detector is so formatted that it reports error with reversed analog polarity for fast and slow.

This error voltage is used to drive a "charge pump" circuit in phase adjuster 73. The phase adjuster 73 has two methods of correction. For large errors pulses are either added or blanked from the output of the reference oscillator, and for small errors a voltage controlled phase shift circuit is used. The detail of this circuit is outside the scope of the present invention.

The result is that the incoming and generated symbol clocks are adjusted to zero difference over a number of received symbols. This adjustment continues during the data phase of the received transmission because both synch and data are used successively to provide the necessary information.

A "coasting" state is not necessary for this circuit. All of the coasting property that is usable is provided by the flywheel filter 711.

MANAGEMENT SIGNALING FUNCTIONS

The possibility of using only the binary values of the synch character as a management channel has been provided within the signal processor function, however its use is an implementation option.

The most common management message (in lieu of "loopback" for duplex systems) is a request to report status. A station so queried responds reporting possibly whether power is ON in the attached equipment and maybe with a report of received signal level. The fact that the station can reply is a very useful fault isolation function.

The radio and signal processor could be active even when the attached Station is unpowered, and the management signaling could have a second message in its vocabulary for activating the remainder of the Station into full function.

There are several possibilities for addressing. One that is usable is a download of long LAN address from the parent station whenever power is applied. This avoids creation of a new address structure just for radio modems, and it guarantees uniqueness of the address.

The scope of this invention includes provision of the physical medium signaling channel and no more. The use and protocol for that channel are defined as outside of the scope of the invention.

POWER CONSERVATION

To conserve battery power, it is desirable to have all circuits unpowered except when needed. For transmitting, a positive local command can turn circuits on. For receiving, the primary method is to have a standby mode in which the presence of a signal can be detected, which then powers the circuits necessary to use and interpret it. If a correlated symbol, the synch pulse, is used to define signal present, the likelihood of false operation is greatly reduced.

Standby mode powers only those circuits necessary to discover the presence of synch. In the preferred implementation, the send-receive latch 715 and preceding circuits for synch recognition are always powered. The indication is active high for receive mode.

The circuits which must be powered in standby mode are—

Correlator: amplifier 31, AGC detect 59, comparators 50E & 50F; and

Quantizer: comparator 69E, OR gate 66C; and

Clock Processor: oscillator 701 & 702, filter 711, slicer 712, latch 71.

All remaining circuits can be powered when indicated by the state of latch 715 or from a transmit command. The default method of unpowering is absence of synch pulses as detect by mod4 counter 713 or external processing.

If the channel has a low proportion of time used for message transfer, this mode is useful. The usefulness is enhanced by reduced probability of false indication of signal present by using the correlated synch pulse as the indicator. The effect of the flywheel filter 711 is to require a plurality of synch pulses for recognition.

While this invention has been described in connection with preferred embodiments thereof, it is obvious that modifications and changes therein may be made by those skilled in the art to which it pertains without departing from the spirit and scope of this invention. Accordingly, the scope of this invention is to be limited only by the appended claims.

What is claimed as invention is:

1. In a digital radio transmission system having a source of binary digital information for transport in bursts from origin to destination, a signal source using that information to generate a bandwidth limited baseband binary waveform, a first transmitting transducer to linearly modulate that information bearing waveform upon a radio frequency carrier which is then amplified and applied to a first radio antenna which radiates the radio frequency energy containing carrier and information, a fading and time dispersive medium over which that radiated radio frequency carrier energy is transferred between source and destination, a second antenna capturing a fraction of that radiated energy, a second receiving transducer connected to said second antenna which demodulates the captured radiated energy and recovers the baseband waveform modulated at the transmitter except as modified by distortion in the transmission medium, and a signal processor to recover the original binary information from said recovered baseband waveform, said signal processor including means for block coding the transmitted digital stream into symbols of 7, 11 or 13 sub-bits, recognition means for detecting particular significant patterns of sub-bits within said symbols, said recognition means including an analog delay line tapped at regular intervals corresponding to the time duration of one sub-bit of said symbols, means for algebraically and linearly summing the signal levels at a number of consecutive taps to detect correlation between received and expected sub-bit patterns, and means for the selection of one or the other of opposed polarities at each tap which represents the expected polarity of the corresponding sub-bit at the collection points of a voltage or current summing network, the improvement comprising:

means for the use of only the Barker pattern for the synchronization of sub-bit and symbol clocks at the beginning of each burst;

means for the transfer of further data by use of one-of-four patterns to carry two-bits of data information per symbol, or one-of-N patterns where N equals the decimal representation of the number of bits per symbol when three or more bits per symbol are coded; and means for limiting sub-bit patterns within said symbols to those where there is a three sub-bit window in which there is no cross-correlation between allowed and possible patterns.

2. The baseband signal processor of claim 1 further including means for sensing of the expected sub-bit pattern by comparing the difference in level at the common junction of the summing network with the sum of other expected correlation patterns when more than one correlation pattern is possible.

3. The baseband signal processor of claim 1 further including means for integrating the differentially derived correlation signal for a time interval of one to three sub-bits before the accumulated time-current product is evaluated, where the time interval is defined by a particular count value of sub-bit clock intervals, and where the end of that interval is the measure of the instant at which the evaluation of said accumulated time-current product is evaluated, and where a subsequent count value is used to dispose of the accumulated charge and to diminish response to correlation peaks outside of the three sub-bit window.

4. The baseband signal processor of claim 1 further including means for utilizing more than one antenna, receiver transducer or correlator to quantify signal receptors in such a way that the better of these receptors contributes more energy to subsequent processing, where the data outputs of said more than one antenna, receiver transducer or correlator are voltage or current summed before the windowed integration operation, and where the synchronization pulses are summed before quantization.

5. The baseband signal processor of claim 1 further including means for sensing the initial synchronization pulses relative to the decayed amplitude of the previous synchronization pulse; where the reference level is stored in a capacitor which is sequentially charged, diminished, used and recharged with controlled rate of discharge before use as a reference; where the periodic symbol pulses, first from synchronization pattern and then from data, are averaged in a resonant circuit with sufficiently low loss that the oscillatory signal amplitude at the sub-bit rate decays to no less than half of the maximum amplitude for one symbol period after the maximum to provide continuing timing in the temporary absence of the normally continuing pulses and to average out perturbations in the timing of individual pulses; and where the locally generated and also the received symbol timing are compared in a phase error detector to provide a control signal for a phase shifter to bring the locally generated clock into synchronization with the average of the received synchronization timing.

6. The baseband signal processor of claim 1 wherein that portion of the total system amplification between the level at which energy is received at the antenna and transducer input and the signal processor input and the point of correlation is small compared with the gain between the input levels and logic level necessary for digital processing.

7. The baseband signal processor of claim 1 wherein the 1-bit-per-symbol form of the signal, using only the Barker character with normal and inverted polarity, is utilized as a fall-back mode of communication when the channel coding with more than 1-bit-per symbol coding is unsuccessful, and where the 1-bit-per-symbol form of the signal is also used for maintenance messages to and from the signal processor independently of higher level processing.

8. The baseband signal processor of claim 1 wherein the 1-bit-per-symbol form of the signal is also used as an activation message for associated equipment which is quiescently unpowered.

9. The baseband signal processor of claim 1 further including the use of a block coded Non-Return-to-Zero waveform where all of the block codes used are either 3-out-of-7 or 4-out-of-7 1's and therefore the Non-Return-to-Zero waveform contains no average direct current component, and where the average value of the output waveform for the synch and inverted synch is fed back to the negative reference input of a comparator.

10. The baseband signal processor of claim 1 further including a quiescent mode wherein only those circuits are powered that are necessary to receive, recognize and store the fact of receiving correlated synch pulses, and where the logic state of receive mode is entered upon receipt of a plurality of said pulses, and where the state of receive mode is used to power all signal processors and external circuits necessary for full receive function.

11. The baseband signal processor of claim 1 including a variable gain baseband amplifier controlled by feeding back the level of the received signal after correlation, utilizing a compressor mode where the range of the output is a fraction of the dynamic range of the input.

12. The baseband signal processor of claim 1 wherein the delay line utilizes an acoustic-propagation transmission line.

13. The baseband signal processor of claim 1 further including data comparators which are powered by a read pulse when the output is used.

* * * * *